US007080159B2

(12) United States Patent
Chu et al.

(10) Patent No.: US 7,080,159 B2
(45) Date of Patent: Jul. 18, 2006

(54) METHOD AND SYSTEM FOR EFFECTING MIGRATION OF APPLICATION AMONG HETEROGENEOUS DEVICES

(75) Inventors: Hao-hua Chu, Mountain View, CA (US); Shoji Kurakake, San Francisco, CA (US)

(73) Assignee: NTT DoCoMo, Inc., Tokyo (JP)

( * ) Notice: Subject to any disclaimer, the term of this patent is extended or adjusted under 35 U.S.C. 154(b) by 667 days.

(21) Appl. No.: 09/737,733

(22) Filed: Dec. 15, 2000

(65) Prior Publication Data

US 2002/0129126 A1 Sep. 12, 2002

(51) Int. Cl.
*G06F 15/16* (2006.01)

(52) U.S. Cl. .............. 709/246; 709/220; 709/228; 710/15; 710/16; 717/107; 717/136; 717/176; 717/177

(58) Field of Classification Search ........ 709/220, 709/228, 246; 710/15–19; 717/107, 136, 717/176–178
See application file for complete search history.

(56) References Cited

U.S. PATENT DOCUMENTS

| 5,457,797 | A | | 10/1995 | Cortopassi et al. | |
|---|---|---|---|---|---|
| 5,603,031 | A | | 2/1997 | White et al. | |
| 5,678,044 | A | * | 10/1997 | Pastilha et al. | 707/104.1 |
| 5,974,258 | A | * | 10/1999 | Ferri et al. | 717/178 |
| 6,035,120 | A | * | 3/2000 | Ravichandran | 717/141 |
| 6,128,590 | A | * | 10/2000 | Stadel et al. | 703/27 |
| 6,260,020 | B1 | * | 7/2001 | Ruffin et al. | 705/1 |
| 6,324,543 | B1 | | 11/2001 | Cohen et al. | |
| 6,334,215 | B1 | * | 12/2001 | Barker et al. | 717/167 |
| 6,356,957 | B1 | * | 3/2002 | Sanchez et al. | 719/328 |
| 6,370,646 | B1 | * | 4/2002 | Goodman et al. | 713/100 |
| 6,370,682 | B1 | * | 4/2002 | Eckardt et al. | 717/141 |
| 6,442,663 | B1 | * | 8/2002 | Sun et al. | 711/202 |
| 6,694,511 | B1 | * | 2/2004 | Yokote | 717/148 |
| 6,701,521 | B1 | * | 3/2004 | McLlroy et al. | 717/173 |
| 2004/0168030 | A1 | * | 8/2004 | Traversat et al. | 711/133 |

FOREIGN PATENT DOCUMENTS

| EP | 0 784 265 A | 7/1997 |
|---|---|---|
| EP | 0 784 265 A2 | 7/1997 |
| EP | 0 928 089 A | 7/1999 |
| EP | 0 928 089 A2 | 7/1999 |
| JP | 04223527 A | 8/1992 |

OTHER PUBLICATIONS

Aramira, Inc. Jumping Beans White Paper, http://www.JumpingBeans.com/index.html, Aug., 2000.

(Continued)

*Primary Examiner*—Kim Huynh
*Assistant Examiner*—Eron Sorrell
(74) *Attorney, Agent, or Firm*—Blakely, Sokoloff, Taylor & Zafman LLP

(57) ABSTRACT

The present invention provides a method and system for implementing migration of an application among heterogeneous devices. An application consists of sets of one or more component. The application running on a source device and the hardware configuration of the target device are examined to port the application to the target device by selecting at least one component from each set that fits to run on the target device. The running state of the application that exits on the source device is captured and sent to the target device. The target device loads the ported application and instantiates it, using the captured running state of the application.

32 Claims, 10 Drawing Sheets

OTHER PUBLICATIONS

Anurag Acharya, et al., "Sumatora: A Language for Resource-aware Mobile Programs", Apr., 1997.

Stefan Fünfrocken, "Transparent Migration of Java-based Mobile Agents," 2nd International workshops on Mobile Agents, Stuttgart, Germany, Sep. 1998.

Robert Gray, et al., "Mobile agents for mobile computing," 2nd Aizu International Symposium on Parallel Algorithms/ Architectures Synthesis, Fukushima Japan, Mar. 1997.

Matthew Izatt, et al., "Ajents: Towards an Environment for Parallel, Distributed and Mobile Java Applications," ACM 1999 Java Grande Conference, Jun. 1999.

Danny B. Lange, et al., "Mobile Agents with Java: The Aglet API," World Wide Web Journal, 1998.

Dejan S. Milojicic, et al., "Mibile Objects and Agents (MOA)," 4th USENIX Conference on Object-Oriented Technologies and Systems (COOTS), Santa Fe New Mexico, Apr. 1998.

Mitsubishi Electic ITA, Horizontal Systems Laboratory, "Mobile Agent Computing," Jan. 1998.

Holger Peine, et al., "The Architecture of the Ara Platform for Mobile Agents," 1st International Workshop on Mobile Agents, Berlin Germany, Apr. 1997.

M. Tanganathan, et al., "Network-aware Mobile Programs," USENIX 1997 Annual Technical Conference, Anaheim California, Jan. 1997.

Markus Straber, et al., "Mole—A Java Based Mobile Agent System," 2nd ECOOP Workshop on Mobile Object Systems, pp. 28-35, Linz Austria, Jul. 1996.

Jim White, "Mible Agents White Paper," General Magic, 1996.

Sun Microsystems, "PersonalJava Technology White Paper," Aug. 1998.

Ad Astra Engineering, Inc. "Jumping Beans™ White Paper"; available online at http://www.JumpingBeans.com; Aug. 23, 2000; pp. 1-42.

Sun Microsystems, Inc. "Java™ 2 Platform Micro Edition (J2ME™)Technology for Creating Mobile Devices: White Paper"; May 19, 2000; pp. i-vi, pp. 1-36.

Milojicic, D. S.; LaForge, W.; Chauhan, D. "Mobile Objects and Agents (MOA)"; available online at http://www.usenix.org/publications/library/proceedings/coots98/full_papers/milojicic/milojicic_html/milojicic.html as of at least Dec. 4, 2000; pp. 1-24.

Izatt, M.; Chan, P.; Brecht, T. "Ajents: Towards an Environment for Parallel, Distributed and Mobile Java Applications"; ACM 1999 Java Grande Conference, San Francisco, CA; Jun. 1999; pp. 1-10.

Sun Microsystems, Inc. "Java™ Remote Method Invocation Specification"; Oct. 1998; pp. i-vi, pp. 1-124.

Sun Microsystems, Inc. "PersonalJava™ Technology White Paper"; Aug. 1998; pp. 1-20.

Mitsubishi Electric ITA Horizon Systems Laboratory. "Mobile Agent Computing: A White Paper"; Jan. 19, 1998; pp. i-iii, pp. 1-30.

Peine, H.; Stolpmann, T. "The Architecture of the Ara Platform for Mobile Agents"; Proceedings of the First International Workshop on Mobile Agents, MA'97, Apr. 7-8, 1997, Berlin, Germany; Lecture Notes in Computer Science Nr. 1219, Springer Verlag, 1997; 12 pp.

Gray, R.; Kotz, D.; Nog, S.; Rus, D.; Cybenko, G. "Mobile Agents for Mobile Computing"; May 2, 1996; available online at URL ftp://ftp.cs.dartmouth.edu/TR/TR96-285.ps.Z; pp. 1-17.

White, J. "Mobile Agents White Paper"; General Magic; 1996; 30 pp.

Banavar, G.; Beck, J.; Gluzberg, E.; Munson, J.; Sussman, J; Zukowski, D. "Challenges: An Application Model for Pervasive Computing"; Proceedings of the Sixth Annual ACM/IEEE International Conference on Mobile Computing and Networking (Mobicom 2000); pp. 266-274; believed to have been published prior to the filing date of U.S. Appl. No. 09/737,733.

Lange, D. B.; Oshima, M. "Mobile Agents with Java: The Aglet API"; pp. 1-18; believed to have been published on the World Wide Web prior to the filing date of U.S. Appl. No. 09/737,733.

Fünfrocken, S. "Transparent Migration of Java-based Mobile Agents: Capturing and Reestablishing the State of Java Programs"; 12 pp.; believed to have been published prior to the filing date of U.S. Appl. No. 09/737,733.

Acharya, A.; Ranganathan, M.; Saltz, J. "Sumatra: A Language for Resource-aware Mobile Programs"; 22 pp.; believed to have been published prior to the filing date of U.S. Appl. No. 09/737,733.

Ranganathan, M.; Acharya, A.; Sharma, S. D.; Saltz, J. "Network-aware Mobile Programs"; 13 pp.; believed to have been published prior to the filing date of U.S. Appl. No. 09/737,733.

ObjectSpace, Inc. "Voyager™ 4.0 Release", 2000; pp. 1-4; believed to have been published prior to the filing date of U.S. Appl. No. 09/737,733.

Straβer, M.; Baumann, J.; Hohl, F. "Mole—A Java Based Mobile Agent System"; pp. 1-10; believed to have been published prior to the filing date of U.S. Appl. No. 09/737,733.

Fumiaki Kanezashi et al., Distributed Pres: A Presentation System Based on Mobile Agent, Multimedia, Distributed, Cooperative and Mobile Symposium, Jun. 28, 2000, pp. 163-168, vol. 2000, No. 7, Information Processing Society of Japan, Japan.

Ryoko Shimokawa et al., "An Architecture Independent Method for ProcessMigration with Translator," Transactions of Information Processing Society of Japan, Jun. 15, 1999, pp. 2553-2562, vol. 40, No. 5, Information Processing Society of Japan, Japan.

Masatoshi Yoshida et al., "Non-Extraction Method of Implementing Mobile Programming Language Systems with Mobile Memory Segment," IPSJ Transactions on High Performance Computing Systems, Nov. 15, 2000, pp. 25-36, vol. 41, No. SIG 8(HPS 2), Information Processing Society of Japan, Japan.

Tatsuo Nakajima et al., "System Support for Migratory Continuous Media Application in Distributed Real-Time Environments," Apr. 12, 1999, pp. 430-441, XP002289879, Springer-Verlag, Berlin, Germany.

S. Pope, "Application Migration for Mobile Computers," Proceedings of Third International Workshop on MACAU, Jun. 3, 1996, pp. 20-26, XP010165522, IEEE Computer Society, California, U.S.A.

Communication enclosing European Search Report dated Aug. 25, 2004.

Collected Essays Of The Multimedia, Distributed, Cooperative And Model Symposium, Fumiaki Kanezasi, et al., Distributed Pres: A Distributed-Type Presentation System Based On A Mobile Agent, Fumiaki Kanezashi et al., Distributed Pres: A presentation system based on mobile agent., Information Processing Society of Japan Symposium Series, vol. 2000, No. 7, Issued on Jun. 28, 2000, Multimedia, Distributed, Cooperation and Mobile (DICOMO) Symposium Essay Collection, Information Processing Society of Japan, Tokyo-to, Japan 108-0023, 12 pages.

Tai, Hideki, et al., The Present State Of Mobile Agent Technology And Future Issues, Computer Software, vol. 16, No. 5, Published Sep. 16, 1999, edited by The Japan Society For Software Science And Technology, Iwanami Shoten Publishing Company, 26 pages.

Shimokawa, Ryoko, et al., An Architecture Independent Method for Process Migration that Employs a Translator, Transactions of Information Processing Society of Japan, vol. 40, Jun. 1999, 24 pages.

Nakajima, T., et. al.: "System Support for Migratory Continuous Media Applications in Distributed Real-time Environments." Springer-Verlag, Germany, 1999: pp. 430-441.

Pope, S.: "Application Migration for Mobile Computers." IEEE 1996: pp. 20-26.

* cited by examiner

METHOD AND SYSTEM FOR EFFECTING MIGRATION OF APPLICATION AMONG HETEROGENEOUS DEVICES

BACKGROUND OF THE INVENTION

This application relates to a method and system for effecting migration of an application among heterogeneous devices or devices with different hardware configurations.

Migration is a process in which an application running on one device stops its task and moves to another device where it resumes the task exactly from the point where it terminated the task on the first device. In this regard, migration differs from remote execution, which is a process in which an application moves from one device to another device where it makes a fresh start irrespective of the state of the application that existed on the first device.

The need for mobility may be the main driving force of evolution of computing devices. The desktop computer has transformed itself into the notebook computer. The PDA and the intelligent pager are new species that recently joined the evolutional tree. Even the cellular phone has recently evolved into having computing capability. Now, these computing devices begin speaking with each other in the form of data communication through various communication networks, such as a wired or wireless LAN, cellular network, Bluetooth, and PAN (Personal Area Network).

The evolution of the computing devices has significant impact upon our life and is changing our business and work environments. Traditionally, since a PC was fixed on a desk and not movable, it was possible to work or process data only the places where a PC with equivalent software was found. Nowadays, however, mobile computing devices, such as a notebook computer, PDA and cellular phone, with sufficient computing capability are readily available to us. The users of these mobile devices may desire to capitalize the mobility of the devices to the full extent. Imagine how efficient and productive the uses can become if they can continue doing their work with a mobile computer at remote places or even while they are traveling. Suppose, for instance, that a mobile phone or PDA user is working on planning a business tip on line with a desktop computer in the office but interrupted by a call for a meeting at a remote place. In such a scenario, the user may desire to continue working on the business trip planning with the mobile phone or PDA on a train or bus on the way to the meeting place or during brakes of the meeting.

To respond to this need, the concept of migration of an application has developed, i.e., the concept that an application moves from one computing device (source device) to another computing device (target device), along with the state of the application. Migration addresses two technical issues: (1) uniformity of an application; and (2) continuity of the execution of an application.

The first issue comes from the differences in hardware configuration of computing devices. They are indeed different in almost every way—computation power, memory size, screen size, means for inputting data, etc. Because of these differences, the computing devices are usually loaded with different applications peculiar to their hardware configurations, yet performing the same job. For instance, we have "Microsoft Outlook" for desktop PCs, "Mail" for Palm PDAs and "PCS Mail" for SPRINT PCS Cell Phones. All of them are different applications but perform the same e-mail function. Users may wonder if they really have to learn how to use all of these different applications to just send and receive e-mails. Under the concept of migration, the same application runs on both source and target devices. Thus, migration serves to eliminate users' time for learning different applications, as well as software developers' time for developing different applications.

The second issue may probably be more challenging. The application restored on the target device is simply not ready to resume the task until it reestablishes the state of the application that existed on the source device. The state of the application includes the execution state and the data state. You could manually reconstruct the state of the application on the target device through troublesome operations, such as saving the application state before the application moves from the source device and reestablishing it after the application is restored on the target device. In a migration process, however, the application moves from the source device, along with the application state, and restart itself on the target device with the application state. Therefore, the application is ready to resume the task upon arrival on the target device.

A number of studies have been reported on various attempts to implement migration of an application. Significantly, most of these studies were conducted, using Java based software architectures. Java is a programming language and not dependent on the hardware configuration of a device on which it runs. More specifically, Java programs are complied into bytecodes, which are high-level, machine-independent codes, and then interpreted to run by a hypothetical interpreter, called a Java virtual machine (JVM). Since Java programs are machine independent, they run on different hardware platforms without the need to perform any special porting work for the programs. Because of this property, Java is often characterized as "Write Once, Run Anywhere."

Because of its machine-independent property, Java is certainly useful and advantageous for implementing migration of an application among heterogeneous devices, i.e., devices with different hardware configurations. In fact, the past studies show that migration of an application under Java-based software architecture was successful at least in limited circumstances. But the problem of these prior studies is that migration of an application was conducted between selected source and target devices that were comparable and sufficiently resourceful for implementing migration of an application. In other words, migration of an application implemented in the prior studies was not actually achieved in really heterogeneous environments.

Obviously, the difficulty arises when an application is migrating from a resourceful device, such as a desktop PC, to a less resourceful device, such as a PDA. Compared to the desktop PC, the PDA is limited in its hardware resources, such as processing speed, memory size, availability of a permanent storage, and reliability of network connectivity. The question is whether migration of an application is nonetheless possible from a desktop PC to a PDA even when the application requires PC-level resources for its running and does not simply fit on the PDA. None of the past studies addresses this question.

BRIEF SUMMARY OF THE INVENTION

It is therefore the objective the present invention to provide a method and system for achieving migration of an application among truly heterogeneous computing devices. To this end, in accordance with the present invention, an application that is migrating adaptively reconfigures itself during the migration process to fit on a target computing device, or ports itself to the target device.

The porting process according to the present invention is unique. In the present invention, an application consists of a plurality of standalone software components. Components are colored into a device independent ("DI") group and a device dependent ("DD") group. DI components can run on different hardware platforms. But DD components require specific hardware configurations for their execution. So the DD group is formed with sets of alternative components designed to run on different hardware platforms. Thus, in addition to DI components, an application includes DD components selected from the sets that fit to run on the device on which the application is running.

The migration process according to the present invention begins with examining an application running on a source device that is about to migrate. The application is examined to determine DD components of the application presently running and availability of their alternative DD components. The hardware configuration of the target device is also examined to pose the application to a target device by selecting DD components that will fit on the target device. The selected DD components, as well as the DI components, are then loaded on the target device. At the same time, the running state of the application that exists on the source device is captured and transferred to the target device. The migration process completes by instantiating the application on the target device, using the captured running state of the application.

In the migration operation according to the present invention, the functions of an application may be apportioned among more than one target devices. DI components are functional components and can run on different platforms. But there may be a case in which a DI component in an application about to migrate performs a task that requires computation capability beyond the capability of the target device. In the present invention, such a task is allotted to a third device with sufficient computation capability. Thus, the DI component migrates to the third device while the other components of the applications migrate to the target device. Thereafter, the target device and the third device, communicating with each other, work together to execute the application.

Thus, according to the present invention, the application running on the source device and hardware configuration of the target device are examined to port the application to the target device. Then, the ported application is loaded on the target device. At the same time, the running state of the application that exists on the source device is captured and transferred to the target device. The target device instantiates the application on it, using the captured running state of the application. An application consists of sets of one or more components, and the application is ported to the target device by selecting from each set at least one component that best fits on the target device.

The application is loaded on the target device from one or more third devices which may include the source device.

There may be more than one target device, and the application is loaded dividedly on the more than one target.

BRIEF DESCRIPTION OF SEVERAL VIEWS OF THE DRAWINGS

The accompanying drawings, which are incorporated in and constitute a part of this specification, illustrate embodiments of the invention and, together with the description, serve to explain the advantages and principles of the invention. In the drawings.

DETAILED DESCRIPTION OF THE INVENTION

Reference will now be made in detail to an implementation of the present invention as illustrated in the accompanying drawings. The preferred embodiments of the present invention are described below, using a Java based software system. However, it will be readily understood that the Java based software system is not the only vehicle for implementing the present invention, and the present invention may be implemented under other types of software systems.

A. Overview of Migration Operation

Figure 1:
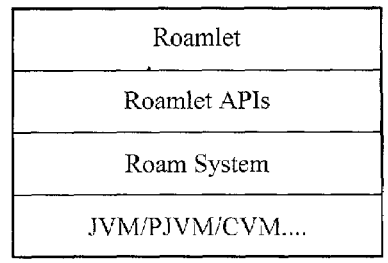
FIG. 1 is a block diagram showing the system architecture of a Roam system according to the present invention.

Migration of an application according to the present invention is executed on a resource-aware application migration ("Roam") system specifically designed to implement the present invention. FIG. 1 is a block diagram illustrating the architecture of the Roam system. As shown in FIG. 1, the Roam system is built on the top of Java Virtual Machine (JVM), PersonalJava Virtual Machine (PJVM) or other types of Virtual Machine, which runs on the top of the native operating system of a device. VM acts like an abstract computing machine, receiving bytecodes and interpreting them by dynamically converting them into a form for execution by the native operating system.

"Roamlet" is a program interfaced directly with a user, such as a word-processing program or a mail program, which is written in Java and executed by JVM, PJVM or other types of VM. In the present invention, a Roamlet migrates from a source device to a target device under the control of the Roam system. The Roam system contains a Roam agent that provides an environment for runtime migration of a Roamlet. The Roam agent performs a critical role for implementation of migration and thus must reside in both source and target devices before migration takes place. Between the Roam system and a Roamlet, a set of Roamlet APIs (Application Program Interface) reside which receive instructions from the Roam agent and perform actual operations for migration of the Roamlet.

Figure 2:
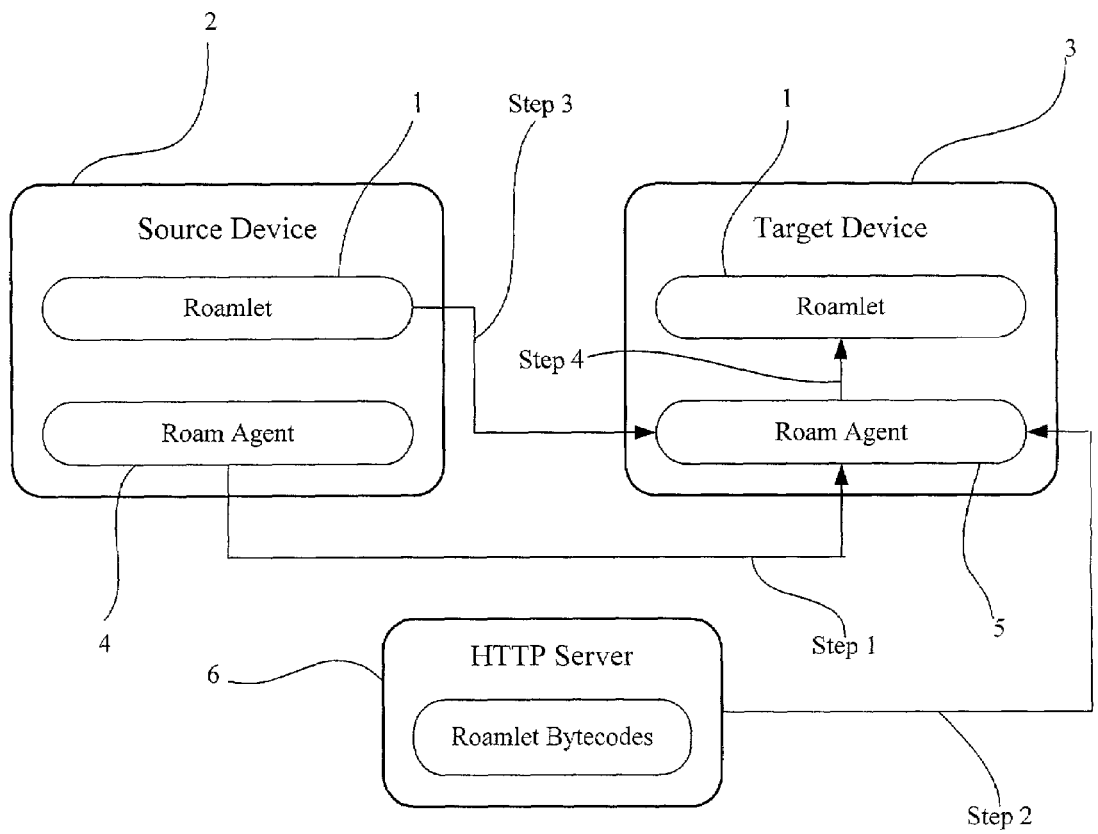
FIG. 2 is a block diagram showing a basic migration operation according to the present invention.

FIG. 2 is a block diagram showing a basic migration operation according to the present invention. In FIG. 2, a Roamlet 1 is about to migrate from a source device 2 to a target device 3. In step 1, upon a call for migration, a Roam agent 4 on the source device 2 begins negotiation with a Roam agent 5 on the target device 3. The negotiation process will be discussed later in detail and therefore briefly summarized here. During the negotiation process, the Roam agent 4 first obtains information from the Roamlet 1 regarding the hardware requirements necessary for the Roamlet 1 to execute. The Roam agent 4 then obtains information from the Roam agent 5 regarding the hardware configuration of the target device 3 in order to determine whether the Roamlet 1 can run on the target device 3. To avoid getting into the detail here, it is assumed that the Roamlet 1 can run on the target device 3. Lastly, the Roam agent 4 gives the Roam agent 5 a URL (Uniform Resource Locator) on an HTTP server 6 from which the bytecode of the Roamlet 1 is downloadable.

In Step 2, upon reception of the URL, the Roam agent 5 accesses the HTTP server 6 and downloads the bytecode of the Roamlet 1 therefrom. In Step 3, the state of the Roamlet 1 is captured by Roam agent 4 and sent to the Roam agent 5. In Step 4, the Roam agent 5 instantiates the Roamlet 1 by reestablishing the captured state of the Roamlet 1 that existed on the source device 2. The migration of the Roamlet 1 ends with closing the Roamlet 1 on the source device 2. The Roamlet 1 is now on the target device and ready to resume the task that was halted on the source device 2.

B. Detailed Description of Migration Operation

1. Device Classification

Roamlets are more or less device dependent. Therefore, the Roam agent on the source device must know the hardware configuration of the target device before migration takes place in order to determine whether a particular Roamlet is executable in its entirety or in part on the target device. An advantage of using Java to construct the Roam system is that a Java runtime system contains information indicating the hardware configuration of the device on which it is running. Currently, there are several Java runtime systems available to provide tailored runtime environments for different computing devices. Table 1 shows exemplary Java runtime systems and their structures.

Table 1 also shows two configurations: CDC (Connected Device Configuration); and CLDC (Connected Limited Device Configuration), and five profiles: Personal Profile; RMI Profile; Foundation Profile; PDA profile and MID (Mobile Information Device) profile. Each of these configurations and profiles is also designed to function effectively with a specific hardware platform. These configurations and profiles are discussed in detail in "Java Specification Requests," Java Community Press, which is incorporated herein by reference.

Thus, by looking into the Java runtime system on a device and examining the types of VM, configuration and profile in the system, it is possible to identify the hardware configuration of the device fairly accurately. It will, however, be understood that the Java runtime system is not the only source for identifying the hardware configuration of a device, and one skilled in the art will readily appreciate that there are other sources available for the purpose. For example, the Roam agent can acquire detailed or precise information on the hardware configuration of a device from a special device capability file created on the device. The hardware information can be obtained from the device capability file by querying the underlying native operating system running on the device.

2. Component-Based Programming

A Roamlet consists of a plurality of distributed software components. Each component contains one or more objects executable to perform the assigned task of the component. Components in a Roamlet are interconnected to one another and perform the purpose of the Roamlet in their entirety. These components are categorized into a device dependent ("DD") group and a device independent ("DI") group. A DD component is a software component whose execution requires specific hardware configuration. In the present invention, one implementation, or one DD component, is provided for one type of hardware platform. An example of DD component is a GUI (Graphical User Interface) component, which requires a different GUI library depending on

TABLE 1

| Profiles | Personal Profile<br>[25 MB ROM +<br>1M RAM] | RMI Profile<br>[25 MB ROM +<br>1M RAM] | Foundation Profile<br>[1 MB ROM +<br>512K RAM] | PDA Profile<br>[512 KB] | MID Profile<br>[136 KB ROM +<br>32 KB RAM] |
|---|---|---|---|---|---|
| Configurations | | CDC [512 KB ROM + 256K RAM] | | | CLDC [160 KB] |
| Virtual Machines | | PJVM | CVM | | KVM |

As shown in Table 1, the Java runtime system consists of three layers: VM; configuration; and profile. Configuration is a Java API specification. Profile specifies extension to a configuration API. There are three types of VM shown in Table 1: PJVM (Personal Java Virtual Machine); CVM (Compact Virtual Machine); and KVM (Kilo Virtual Machine). These VMs are designed to adapt to specific hardware configurations. For instance, the KVM is suitable for devices with 16/32-bit RISC/CISC microprocessors, and with as little as 160 K of total memory available. The PJVM is discussed in "PersonalJava™ Technology—White Paper", Sun Microsystems, August 1998, which is incorporated therein by reference. The CVM is discussed in "JSR #000036 J2ME™ Connected Device Configuration", Sun Microsystems, August 2000, which is incorporated therein by reference. The KVM is discussed in "J2ME CLDC/KVM Palm Release: Release Notes/CLDC 1.0", Sun Microsystems, May 2000, which is incorporated therein by reference.

a type of input and display hardware on which it acts. For a Roamlet that requires inclusion of a GUI component are prepared for the Roamlet to run on different hardware platforms. Those GUI components include a GUI component for PCs, GUI component for PDAs, and GUI components for other platforms. When the Roamlet is migrating to a target device, one GUI component that is most suitable to the hardware configuration of the target device is selected and instantiated on the target device.

On the other hand, a DI component is a functional component. In the present invention, one implementation, or one DI component, is prepared for multiple hardware platforms. Because of its functional characteristic, the DI component is expected to run on different hardware platforms. It is, however, recognized that some DI components require specific hardware capabilities, such as high computation capability. If a Roamlet is migrating to a target device that is short of the hardware capability as required by a DI component in the Roamlet, the DI component will be off-loaded from the Roamlet and migrate to a third device, as will later be explained in detail.

Thus, for each Roamlet, one set of DI components is prepared, and multiple sets of DD components are prepared so that the Roamlet can run on different hardware platforms. Please note that although multiple sets of DD components are prepared for one Roamlet, in a Roamlet actually running on a device, only one set of DD components is instantiated on the device that best fits on the hardware configuration of the device. As will be described fully in the following section, in order to select a set of DD components that best fits on a target device, the Roam agent on a source device examines all sets of DD components prepared for a Roamlet about to migrate and compares the hardware configuration required by each set with the hardware configuration of the target device.

These DI and DD components are programmed in Java and compiled into bytecode and stored on a server, such as the HTTP server 6 discussed above. These components are selectively downloaded on a target device from the server according to the hardware configuration of the target device. Please note, however, that if the source device has a sufficiently large memory, the DI components and all sets of the DD components of a Roamlet may reside on the source device irrespective whether or not they are in use.

3. Dynamic Instantiation

Figure 3:
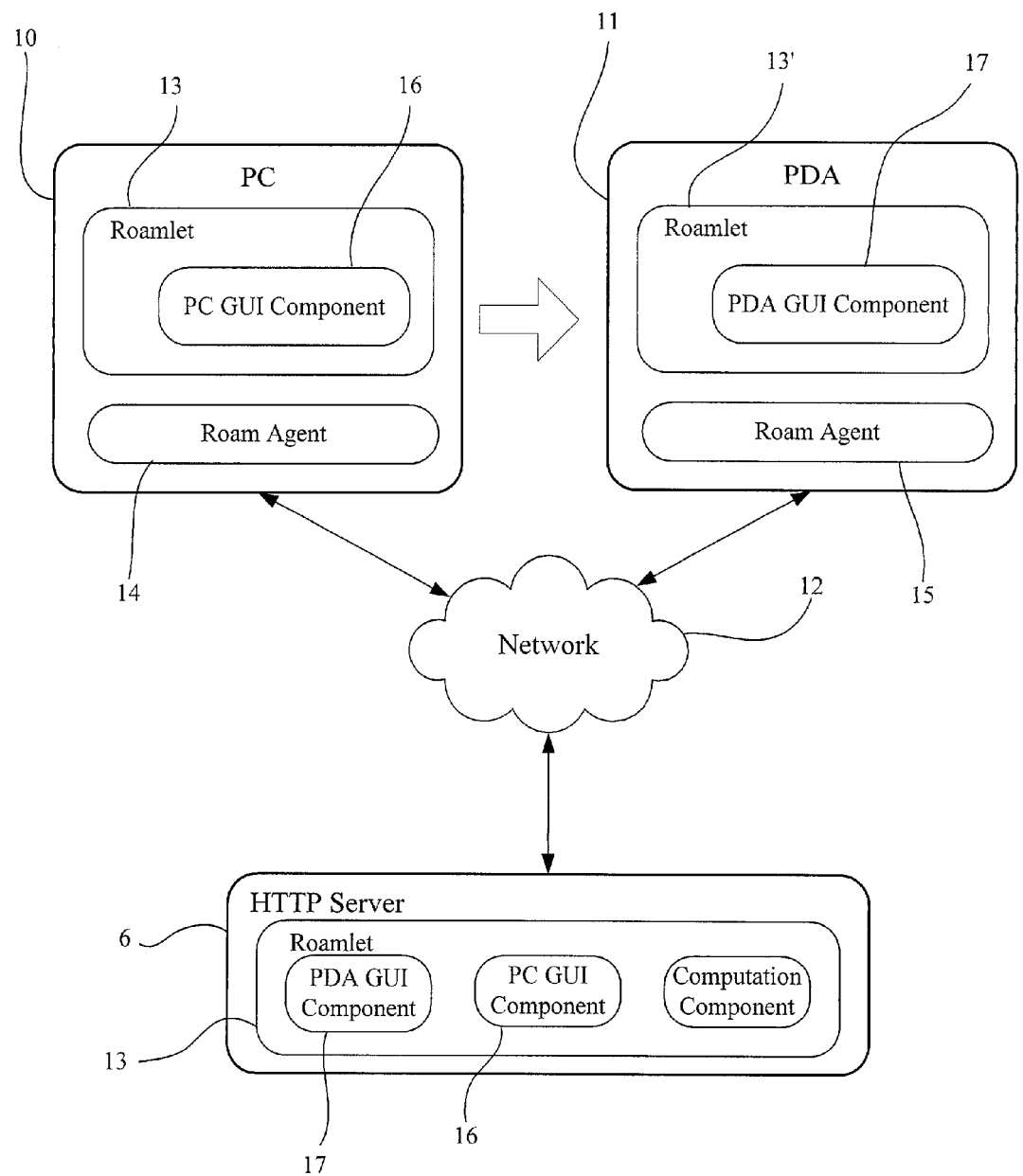
FIG. 3 is a block diagram showing a migration operation according to a first embodiment of the present invention.

Turning now to FIG. 3, details of the migration operation will be discussed. In FIG. 3, a source device 10 is a PC, and a target device 11 is a PDA. The PC 10 and the PDA 11 are connected to each other through a communication network 12 and identified with unique IP addresses (Internet Protocol address) on the communication network 12. A Roamlet 13 is currently running on the PC 10 and about to migrate to the PDA 11. Upon a call for migration, a Roam agent 14 residing on the PC 10 begins negotiation with a Roam agent 15 residing on the PDA 11.

Figure 4:
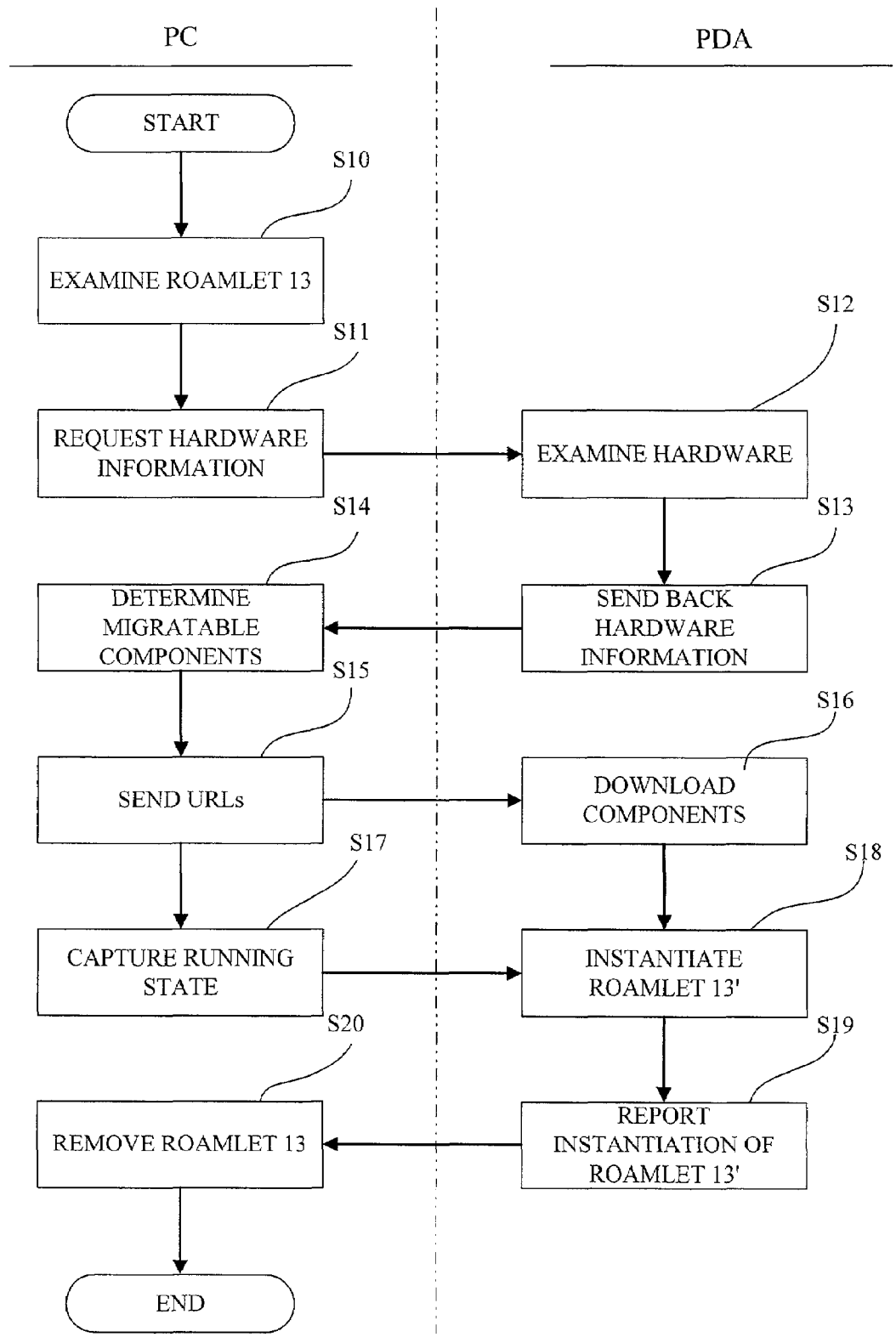
FIG. 4 is a flowchart showing details of the migration operation shown in FIG. 3.

FIG. 4 is a flowchart showing the migration operations step by step. In step 10, the Roam agent 14 examines the Roamlet 13 and its components running on the PC 10. In examining the Roamlet 13, the Roam agent 14 identifies the DI components and DD components of the Roamlet 13 currently running on the PC 10 and alternative DD components available for execution of the Roamlet 13 on different hardware platforms. Suppose that the Roamlet 13 includes a GUI component 16 which runs only on PCs and that the Roam agent 14 finds that an alternative GUI component 17 for PDAs is available for execution of the Roamlet 13 on PDAs.

In Step 11, the Roam agent 14 contacts the Roam agent 15 on the PDA 11 and requests information on the hardware configuration of the PDA 11. In response to the request from the Roam agent 14, the Roam agent 15 examines the Java runtime system running on the PDA 11 (Step 12). Based on the types of the VM, configuration and profile contained in its own runtime system, the Roam agent 15 determines the hardware settings of the PDA 11, such as computation power, screen size and memory size. The Roam agent 15 then sends information regarding the hardware configuration of the PDA 11 back to the Roam agent 14 (Step 13). Please note that if more detailed or precise information on the hardware configuration of the PDA 11 needs to be obtained, the Roam agent 15 may look into the devise capability file located in the underlying native operating system on the PDA 11.

In Step 14, the Roam agent 14 determines, based on the information from the Roam agent 15 regarding the hardware configuration of the PDA 11, which components can migrate to the PDA 11 and which components cannot. All the DI components of the Roamlet 13 are migratable regardless of the hardware configuration of the PDA 11. Some of the DD components of the Roamlet 13 may also be migratable to the PDA 11. For DD components that are not migratable because of the hardware differences between the PC 10 and the PDA 11, the Roam agent 14 searches for alternative components executable on the PDA 11.

In Step 15, the Roam agent 14 sends the Roam agent 15 URLs of the migratable DI and DD components and the alternative DD components stored on the HTTP server 6. In the example illustrated in FIG. 3, the PC GUI component 16 currently running on the PC 10 is not migratable to the PDA 11. The Roam agent 14 thus sends the Roam agent 15 a URL of the PDA GUI component 17 stored on the HTTP server 6.

In Step 16, the Roam agent 15 accesses the server 6 with the URLs sent from the Roam agent 14 and begins downloading the components stored in the form of bytecodes in the server 6. At the same time, in Step 17, the Roam agent 14 captures the running state of the Roamlet 13 on the PC 10 and sends the captured state to the Roam agent 15. In Step 18, the Roam agent 15 deploys the Roamlet 13' on the PDA 11 and reestablishes the captured state in the deployed Roamlet 13'. The Roamlet 13' is now ready to resume the task on the PDA 11. The Roam agent 15 advises the Roam agent 14 in Step 19 that the Roamlet 13' has been successfully replicated on the PDA 11. In response, the Roam agent 14 removes the Roamlet 13 from the PC 10 (Step 20).

In the present invention, capturing and reestablishing of the running state of the Roamlet 13 are implemented, using Java object serialization. Java object serialization offers a convenient way to capture and reestablish the running state of a Java program. In the embodiment shown in FIG. 3, the Roam agent 14 invokes Java object serialization on the PC 10 to serialize the running state of all Java objects that exist in the Roamlet 13. The Roam agent 15 also invokes Java serialization on the PDA 11 to deserialize the serialized running state into the Roamlet 13' on the PDA 11. The state serializable by Java object serialization includes the values of all variables of each object existing in the Roamlet 13. By using the Java object serialization, most of the running state of the Roamlet 13 can be captured on the PC 10 and reestablished on the PDA 11.

However, two types of running state elude Java object serialization. One type of running state is peculiar to the Roam system. That is, the running state of a DD component to be replaced with an alternative DD component cannot be reestablished in the alternative DD component. A DD component and its alternative component often comprise different objects, and the running state of a DD component is meaningless to its alternative component. Accordingly, a conversion process is necessary to preserve the running state between a DD component and its alternative component. For instance, returning to FIG. 3, suppose that the PC GUI component 16 implements user interface with check buttons, whereas the PDA GUI component 17 implements user interface with choice buttons. In order to transfer the running state of the PC GUI component 16 into the PDA GUI component 17, the Roam agent 14 maps the values of the check buttons to the choice buttons and converts the values into those of the choice buttons.

The second type of running state elusive to Java object serialization is the execution state of VM interpreting the Roamlet 13. Java object serialization cannot access inside VM. Therefore, the execution state of VM, such as the call stack, is not serializable. To cope with this, the Roam agent 14 may allow migration to take place only at specific points where the call stack is minimal in order to minimize an amount of the execution state lost.

The following is an exemplary Roamlet API for implementing the basic migration process under the Roam system:

```
public abstract class Roamlet implements Serializable {
    public Roamlet(Object[] args);
    public synchronized final void migrate(String hostname);
    public synchronized boolean onInitialization();
    public synchronized boolean onRemoval();
    public synchronized boolean onArrival();
    public synchronized boolean exit();
    static final void instantiate(String className, Object[] initArgs,
        String codebase);
}
```

All Roamlets must extend the class Roamlet. The method "migrate( )" is to dispatch a Roam let to the target device indicated by "hostname." The method "onInitialization( )" is called when the Roamlet is instantiated for the first time on the target device. The method "onRemoval( )" is called before the Roamlet is removed from the source device after it is successfully migrated to the target device. The method "onArrival( )" is called when the Roamlet arrives at the target device. The method "exit( )" is to remove the Roamlet from the source device. The method "instantiation( )" is to instantiate the Roamlet on the target device. After the Roamlet is instantiated on the target device, a separate thread is created on the target device to run it. This eliminates the overhead of creating and running multiple virtual machines on the target device.

The following is an exemplary Roamlet API for maintaining a group of alternative DD components that performs the same function:

```
Public abstract class Roamlet implements Serializable {
    public synchronized boolean
    addDDComponentDescList(RoamComponentDesc
        descList[]);
}
```

The method "addDDComponentDescList( )" is to add a descriptor list, i.e., RoamComponentDesc[ ]. This descriptor list lists alternative DD components in relation to hardware settings. For example, the descriptor list includes all of the alternative GUI components, such as a PC GUI component, a PDA GUI component, and a cell phone GUI component. When migration takes place, one component is selected from the descriptor list that is best suited to the target device.

4. Apportion of Functions Among Devices

Figure 5:
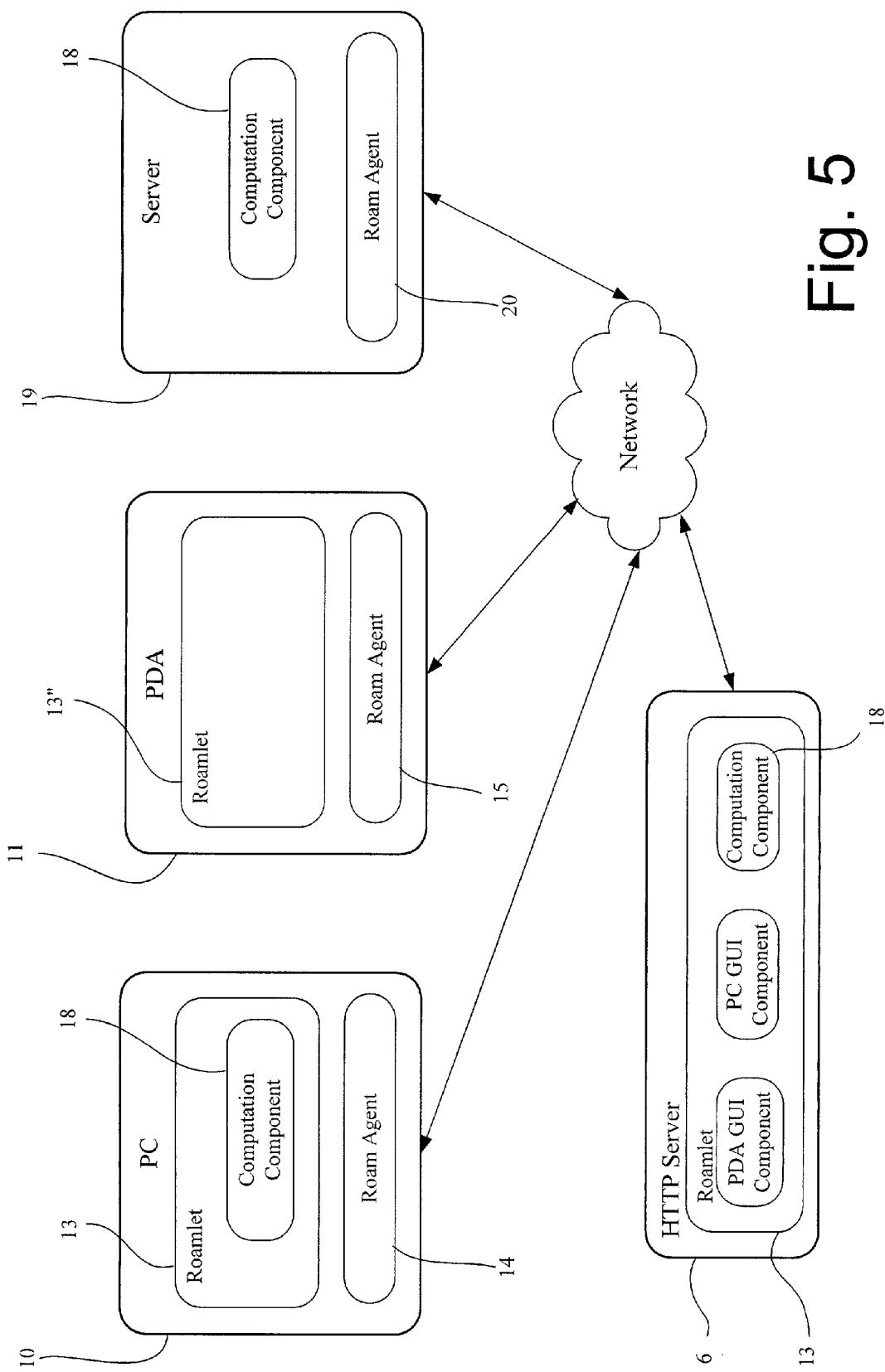
FIG. 5 is a block diagram showing a migration operation according to a second embodiment of the present invention.
Figure 6:
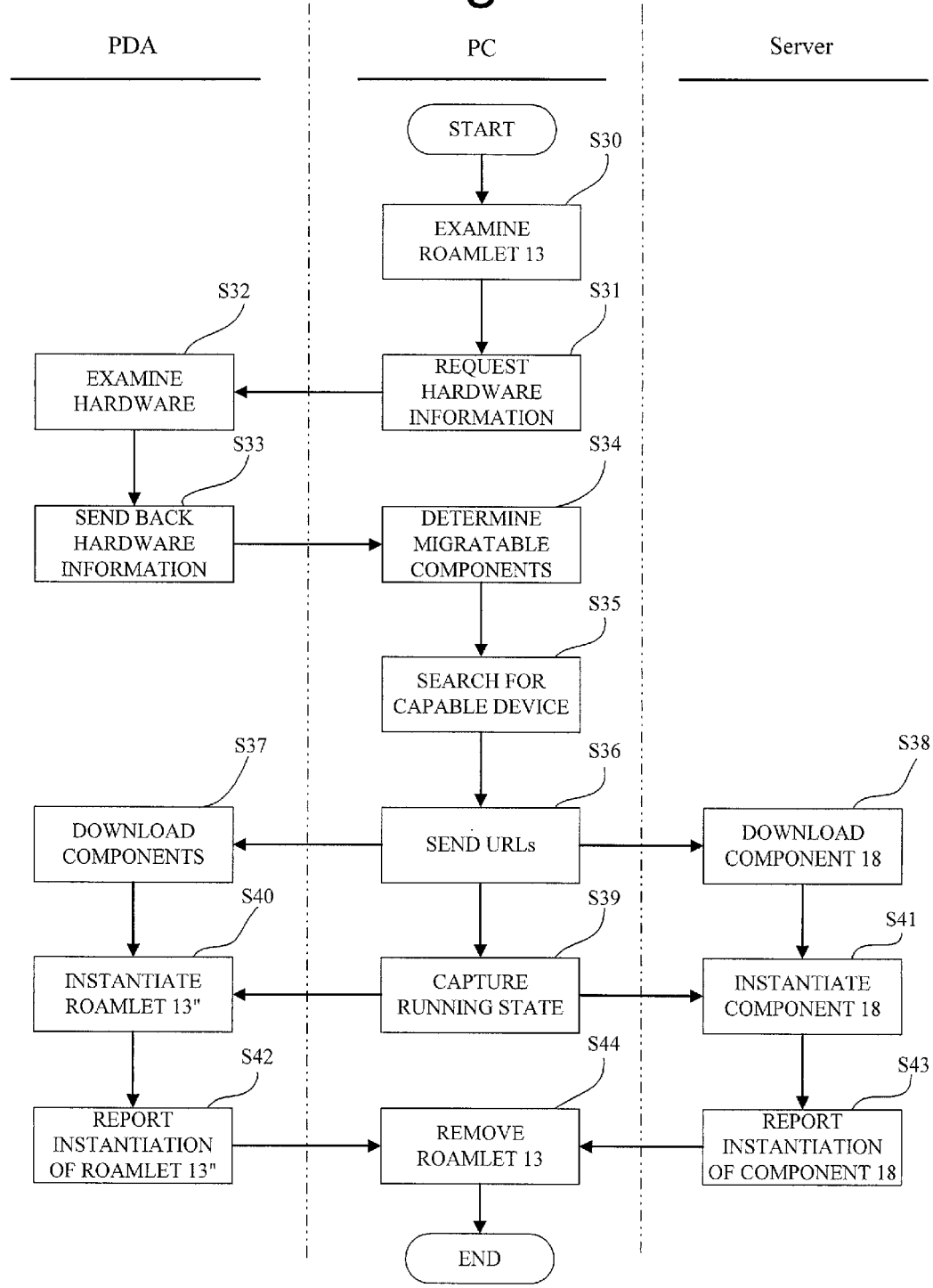
FIG. 6 is a flowchart showing details of the migration operation shown in FIG. 5.

There may be cases in which some DI components indispensable for execution of a Roamlet are not executable on the target device due to insufficiency of the hardware resource of the target device. In such cases, the Roam system apportions the functions of the Roamlet among devices, i.e., the Roam system allows the components to migrate to different target devices. FIGS. 5 and 6 are a block diagram showing such an apportioning operation and a flowchart detailing the operation. In FIG. 5, the same reference numbers as used in FIG. 3 are assigned corresponding devices and software components.

In FIG. 5, as in FIG. 3, the Roamlet 13 is about to migrate from the source device 10, a PC, to the target device 11, a PDA. In step 30, the Roam agent 14 examines the Roamlet 13 and identifies the DI components and DD components of the Roamlet 13 currently running on the PC 10. Suppose that the Roamlet 13 includes a DI component 18 that performs a heavy, memory consuming computation task the execution of which requires computation capability beyond that of the PDA 11, and thus although being a DI component, the component 18 cannot run on the PDA 11. Suppose further that the DI component 18 is indispensable for the execution of the Roamlet 13, but there is no alternative component available for PDAs.

In Step 31, the Roam agent 14 contacts the Roam agent 15 on the PDA 11 and requests information on the hardware configuration of the PDA 11. In response to the request from the Roam agent 14, the Roam agent 15 examines the Java runtime system running on the PDA 11 and determines the hardware configuration of the PDA 11 (Step 32). The Roam agent 15 then sends in Step 3 information regarding the hardware configuration of the PDA 11 back to the Roam agent 14.

In Step 34, the Roam agent 14 then determines, based on the hardware information from the Roam agent 15, which components of the Roamlet 13 can migrate to the PDA 11 and which components cannot. Because of the limited computation capability of the PDA 11, the Roam agent 14 determines that the component 18 cannot migrate to the PDA 11. The Roam agent 14 has already determined in Step 30 that there is no alternative component available to the PDA 11.

In Step 35, the Roam agent 14 first determines whether or not the computation component 18 is off-loadable from the Roamlet 13. If it is determined that the component 18 is off-loadable, the Roam agent 14 moves on to continue the migration operation. If the component 18 is not off-loadable from the Roamlet 13, migration simply fails, and the Roam agent 15 aborts the migration operation. If the component 18 is off-loadable, the Roam agent 15 then begins a search for a third device capable of executing the component 18. The user may participate in this device searching and appoint a particular device to which the user wants the component 18 to migrate. Suppose that the Roam agent 14 successfully finds a server 19 that has sufficient computation power to run the component 18 on it.

In Step 36, the Roam agent 14 sends the Roam agent 15 URLs of the components of the Roamlet 13 stored on the server 6 that are migratable to the PDA 11. In addition, the Roam agent 14 sends a Roam agent 20 on the server 19 a URL of the component 18 stored on the server 6. The Roam agent 15 downloads, using the specified URLs, the bytecodes of the components from the server 6 (Step 37). Likewise, the Roam agent 20 downloads the bytecode of the component 18 from the server 6 (Step 38). At the same time, in Step 39, the Roam agent 14 captures the running state of the Roamlet 13 and sends the captured state to the Roam agent 15 and the captured state of the component 18 to the Roam agent 20. The Roam agent 15 instantiates the Roamlet 13" on the PDA 11 (Step 40), using the captured state from the Roam agent 14. Similarly, the Roam agent 20 instantiates the component 18 on the server 19 (Step 41). The Roam agents 15 and 20 advise the Roam agent 14 that the Roamlet 13" and the component 18 are replicated respectively on the PDA 11 and the server 19 (Steps 42 and 43). The Roam agent 14 then removes the Roamlet 13 from the PC 10 (Step 44). The Roamlet 13" is ready to resume the task on the PDA 11.

Under the Roam system, it is possible for the Roamlet 13" to migrate back to the PC 10 from the PDA 11. In such a reverse apportioning operation, the Roam agent 15 on the PDA 11, which is now the source device, executes the procedures as shown in FIG. 4 to transfer the Roamlet 13" back to the PC 10, which is now the target device. Likewise, the Roam agent 20 transfers the component 18 back to the PC 10. Please note that some of the components running on the PDA 11 may have become unmigratable back to the PC 10. If such components exist, the components will stay on the PDA 11.

The following is an exemplary Roamlet API for performing apportion of functions:

```
public abstract class Roamlet implements Serializable {
    public synchronized boolean
    addDIComponentDesc(RoamComponentDesc desc);
    public synchronized RoamComponent getComponent(String id);
    public synchronized boolean registerServerDevice(String hostname);
    public synchronized boolean registerServerDevices(String hostnames[]);
};
public class RoamComponentDesc {
    public RoamComponentDesc(String id, String classname, String
    reqDeviceCapability, boolean offloadable, boolean reverseApportion,
    Object[]
    initArgs);
};
public class RoamComponent;
```

Each Roamlet component extends the class RoamComponent. The method "addDIComponentDesc( )" is called to add a descriptor, RoamComponentDesc, for each of its DD components. The descriptor contains information on how to instantiate each of the DD components, i.e., for each of the DD components, it contains information regarding its unique identifier (id), the name of class to be instantiated (classname), the required device capability to run the component (reqDeviceCapability), whether the component is off-loadable (offloadable), whether the component is reverse-apportion-able (reverseApportion), and parameters for the constructor (initArgs). The method "getComponent (id)" is called to retrieve the references to the components (using id) after they are instantiated on the target device. The method "registerServerDevice( )" is called to register all devices to which the components are off-loadable.

C. EXAMPLES

Figure 7:
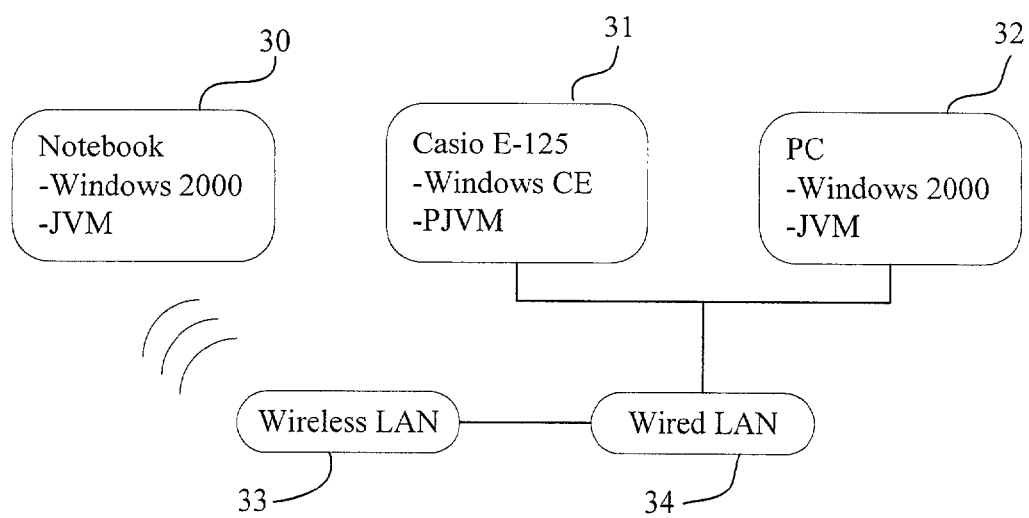
FIG. 7 is a block diagram showing a computer network used in examples implementing the present invention.

Experiments were conducted to implement the present invention, using the computer network shown in FIG. 7. The network comprises a notebook 30, a PDA 31, Casio E-125, and a PC 32. Windows 2000 OS and Standard VM (JVM) run on the notebook 30 and the PC 32. Windows CE OS and PersonalJava VM (PJVM) run on the PDA 31. The notebook 30 is connected to the network through a wireless LAN 33. The PDA 31 and the PC 32 are connected to the network through a wired LAN 34. In the network, the notebook 30 is assigned an IP address of 172.21.96.17. The PDA 31 is assigned an IP address of 172.21.96.152. The PC 32 is assigned an IP address of 172.21.96.19. Each of the notebook 30, the PDA 31 and the PC 32 is loaded with a Roamlet agent, whose code size is approximately 24 Kbytes, small enough to run on most devices with a Java-based software architecture.

1. Example 1

Hello World

Figure 8:
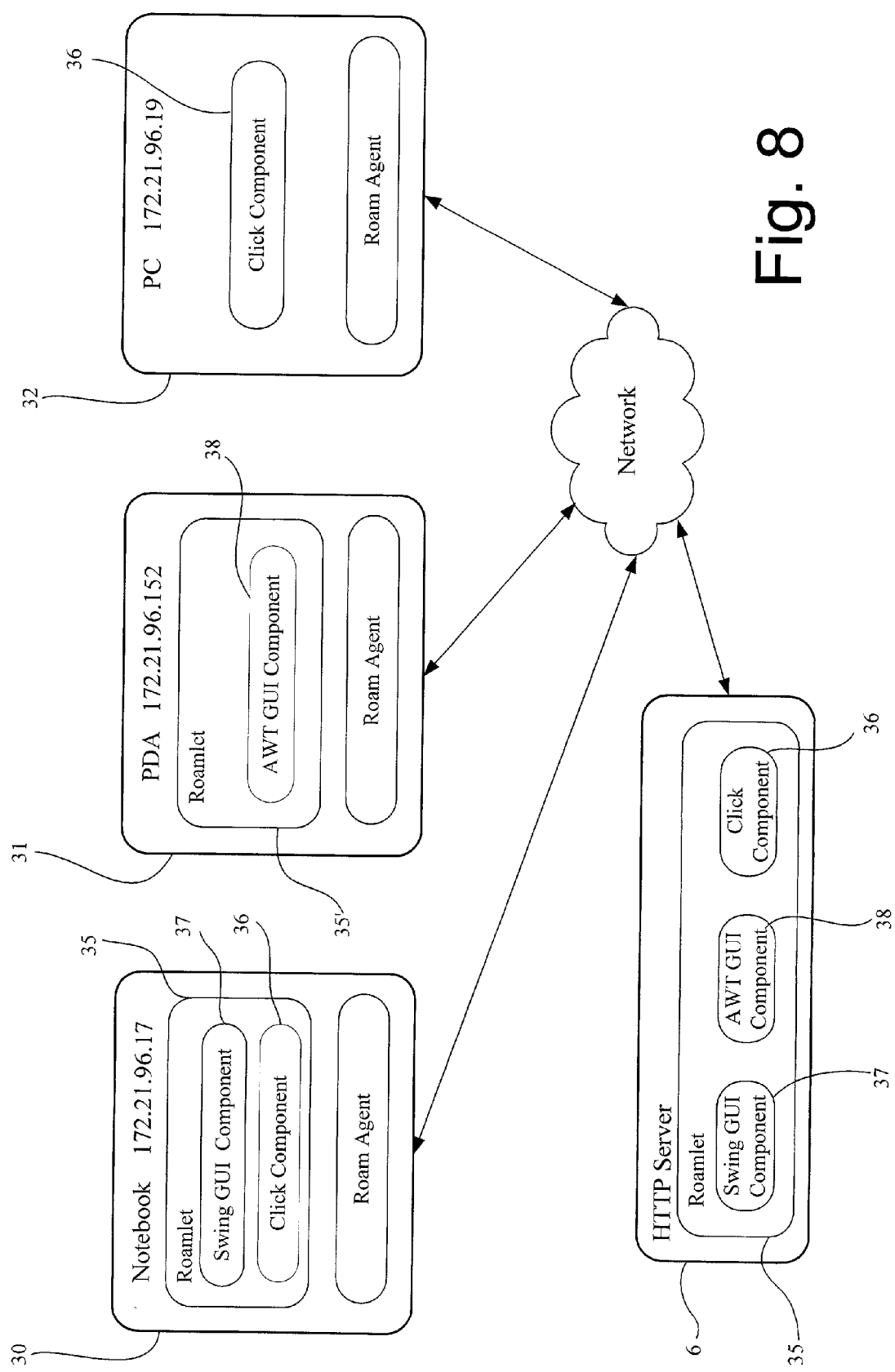
FIG. 8 is a block diagram showing a migration operation conducted in a first example.

As shown in FIG. 8, the notebook 30 runs a Roamlet 35, called "HelloWorld," which is about to migrate to the PDA 31. The HelloWorld Roamlet 35 consists of two component: a Click component 36; and a Swing GUI component 37. The Click component 36 counts the number of mouse clicks made by a user. The Swing GUI component 37 displays the count of the mouse clicks on the notebook 30. Before the migration of the Roamlet 35 from the notebook 30 to the PDA 31, a couple of rules are laid down to demonstrate the functions of the Roam system. First, the Click component 36 requires more hardware capability than the PDA 31 has. Second, the Swing GUI component 37 requires a Java Swing library for its execution. The Java Swing library is supported by Standard Java but not supported by PersonalJava. Thus, the Swing GUI component 37 can run on the notebook 30 and the PC 32 but cannot run on the PDA 31. Alternative to the Swing GUI component 37, an AWT (Abstract Window Toolkit) GUI component 38 is made available for execution of the Roamlet 35. The AWT GUI component 38 requires a Java AWT library for its execution, which is supported by the PersonalJava.

Figure 9B:
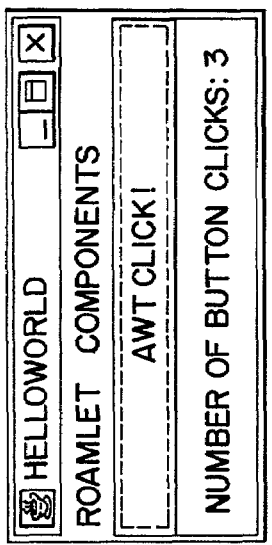
FIGS. 9(a), (b) and (c) are displays on notebook, PDA and PC used in the first example.
Figure 9A:
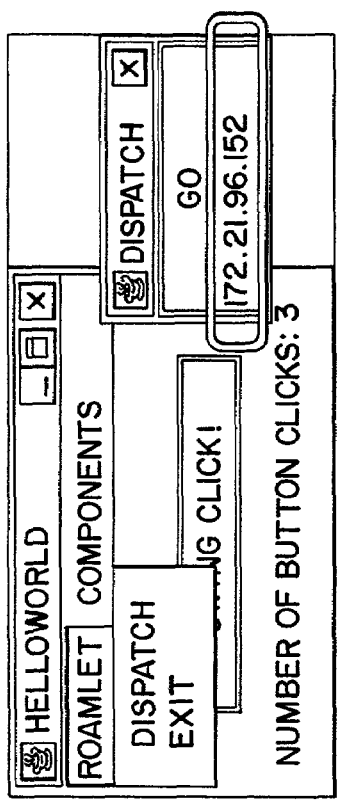
Figure 9C:
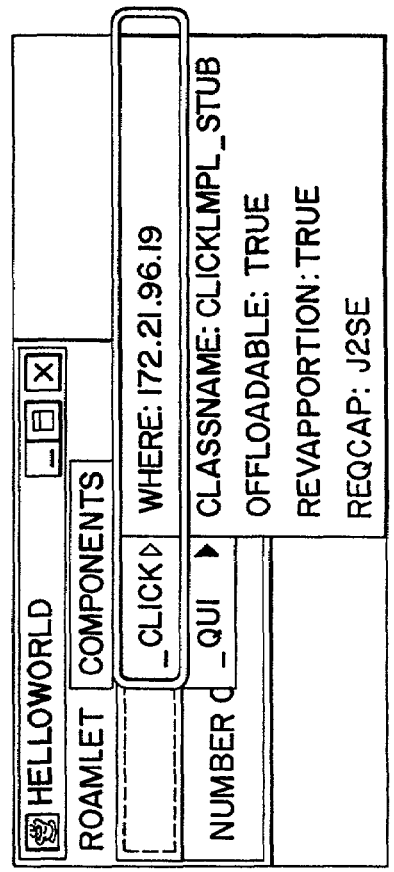

The migration of the Roamlet 35 is performed according to the rules. Thus, the Click component 36 migrates not to the PDA 31 but to the PC 32. The Swing GUT component 37 is discarded. Instead, the AWT GUT component 38 is instantiated on the PDA 31. FIGS. 9(a), (b) and (c) show the screens of the notebook 30, the PDA 31 and the PC 32, respectively. Before the migration, the HelloWorld Roamlet 35 is running on the notebook 30. The click count displayed on the screen of the notebook 30 is initially zero. Each time the "Swing Click" button on the screen is clicked, the Click component 36 increments the count of the clicks, and the Swing GUT component 37 displays the count on the screen. In FIG. 9(a), the count is "3". A migration then takes place. The AWT GUT component 38 is instantiated on the PDA 31, in place of the Swing GUT component 37. As shown in FIG.(b), the AWT GUT component 38 displays count "3" on the screen of the PDA 31. The Click component 36 is instantiated on the PC 32 (FIG. 9(c)). In this example, the migration took less than 5 seconds. It was also observed that each time the "AWT Click" button on the PDA screen was clicked, the click was counted by the Click component 36 on the PC 32, and the click count displayed on the PDA screen was incremented.

2. Example 2

Connect4

Figure 10:
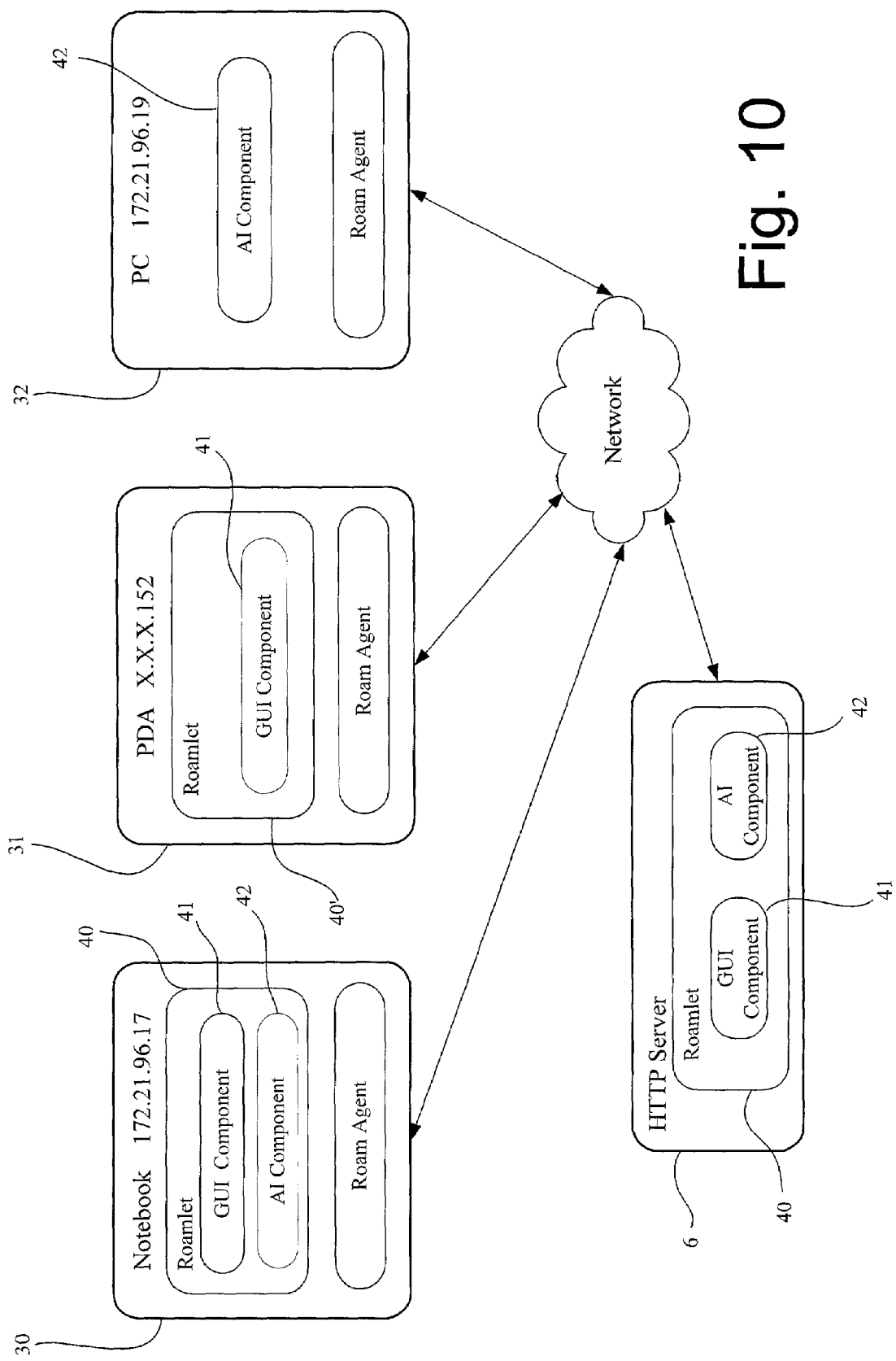
FIG. 10 is a block diagram showing a migration operation conducted in a second example.

Example 2 used a game program called "Connect4." As shown in FIG. 10, the notebook 30 runs a Roamlet 40, called "Connect4," which is about to migrate to the PDA 31. The Connect4 Roamlet 40 consists of two component: a GUT component 41; and an AI (artificial intelligence) component 42. The AI component 42 performs the computation work, such as searching trees, for playing the game, and the GUT component 41 displays progresses of the game on the notebook screen. Again, a couple of rules are laid down before the migration. First, the Al component 42 requires more hardware capability than the PDA 31 has. Second, the GUT component 41 can run on both the notebook 30 and the PDA 32.

Figure 11B:
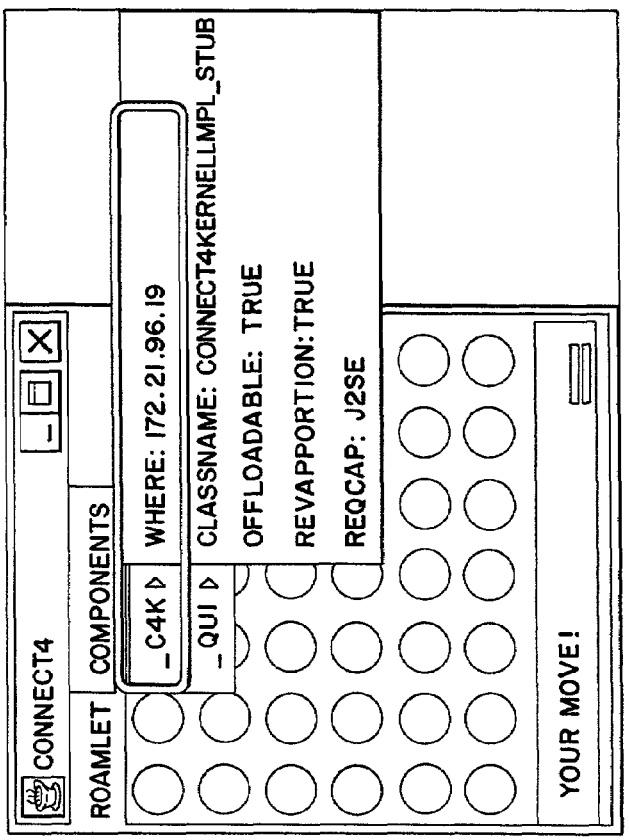
FIGS. 11(a) and (b) are displays on notebook and PDA used in the second example.
Figure 11A:
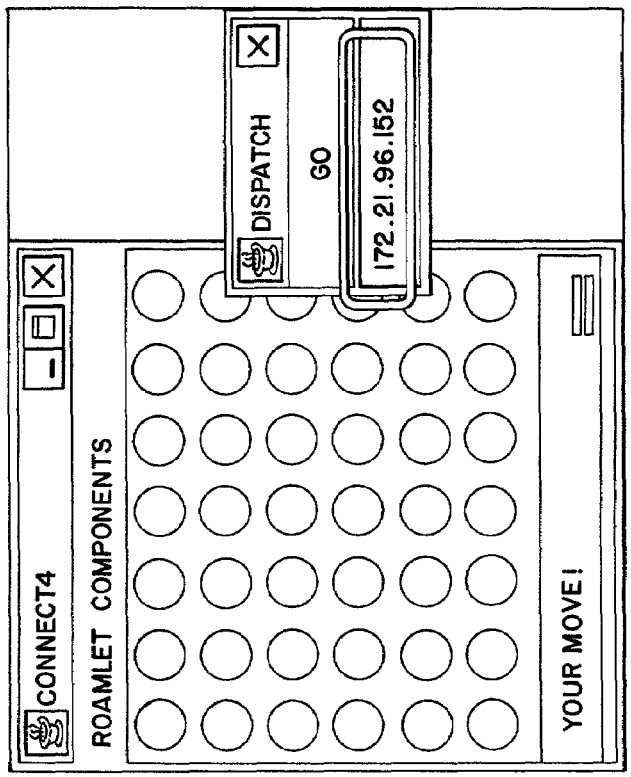

The migration of the Roamlet 40 is performed according to the rules. Thus, the GUI component 41 migrates to the PDA 31, but the Al component 42 migrates to the PC 32. FIGS. 11(a) and (b) show the screens of the notebook 30 and the PDA 31, respectively. Before the migration, the Connect4 Roamlet 40 is running on the notebook 30 as shown in FIG. 11(a). Then, a migration takes place. The GUI component 41 is instantiated on the PDA 31, and the AI component 42 is instantiated on the PC 32. As shown in FIG. (b), the same display appears on the PDA 31. In this example, the migration took less than 5 seconds. It was also observed that the game was playable on the PDA 31 with the AI component 42 instantiated on the PC 32.

It will be appreciated by those skilled in this art that various modifications and variations can be made to the above-embodiments without departing from the spirit and scope of the invention. Other embodiments of the invention will be apparent to those skilled in this art from consideration of the specification and practice of the invention disclosed therein. It is intended that the specification and examples be considered exemplary only, with a true scope and spirit of the invention being indicated by the following claims.

The invention claimed is:

1. A method for effecting migration of an application running on a source device to a target device, comprising:
   examining the application running on the source device and automatically obtaining hardware configuration information about the target device to port the application to the target device;
   causing the ported application to be loaded on the target device, including selecting migratable program components of the application to port to the target device based on the hardware configuration information about the target device, wherein selecting migratable program components comprises selecting one or more device dependent components and one or more device independent components to port to the target based on information about the target device, including selecting one device dependent component different than that which is running on the source device;
   transferring to the target device a running state of the application that exists on the source device; and
   causing the ported application to be instantiated on the target device, using the running state transferred from the source device.

2. A method according to claim 1, wherein transferring the running state of the application to the target device occurs before causing the ported application to be loaded on the target device.

3. A method according to claim 1, and the application is ported to the target device by selecting from each set at least one component that best fits on the target device.

4. A method according to claim 1, wherein causing the ported application to be loaded on the target device comprises a group of devices loading the ported application onto the target device.

5. A method according to claim 4, wherein the group of devices includes the source device.

6. A method according to claim 1, wherein the target device is one of a plurality of target devices, and further comprising dividing the application and loading the divided application onto more than one of the plurality of target devices.

7. The method defined in claim 1 wherein the application consists of sets of one or more components, and further comprising
   selecting at least one component from each set of one or more components based on the hardware configuration of the target device; and
   signaling the target device to download the at least one component from each set of one or more components, such that the ported version of the application comprises at least one component from each set of one or more components that is best suited to execute on the target device.

8. The method defined in claim 1 further comprising:
   determining whether the target device cannot adequately handle execution of the ported application; and
   soliciting another target device to execute a portion of the ported application.

9. A system for effecting migration of an application running on a source device to a target device, comprising:
   (a) a first agent operable to automatically obtain information about the hardware configuration of the target device, and examine, in reference to the hardware configuration, the application running on the source device in order to port the application to the target device and captures a running state of the application on the source device, the first agent being operable to select migratable program components of the application to port to the target device based on the hardware configuration information about the target device, wherein the first agent selects migratable program components by selecting one or more device dependent components and one or more device independent components to port to the target based on information about the target device, including selecting one device dependent component different than that which is running on the source device;
   (b) a second agent operable to load the ported application and instantiate the ported application on the target device, using the captured running state of the application.

10. A system according to claim 9, and the application is ported to the target device by selecting from each set at least one component that best fits on the target device.

11. A system according to claim 9, wherein the second agent loads the application on the target device from a group of devices.

12. A system according to claim 11, wherein the group of devices includes the source device.

13. A system according to claim 9, wherein the target device is one of a plurality of target devices, and the application is divided and distinct portions of the application are loaded onto more than one of the plurality of target devices.

14. The system defined in claim 9 wherein the application consists of sets of one or more components, and further wherein the first agent is operable to select at least one component from each set of one or more components based on the hardware configuration of the target device; and the second agent is operable to signal the target device to download the at least one component from each set of one or more components, such that the ported version of the application comprises at least one component from each set of one or more components that is best suited to execute on the target device.

15. The system defined in claim 9 wherein the first agent is operable to:
   determine whether the target device cannot adequately handle execution of the ported application; and
   solicite another target device to execute a portion of the ported application.

16. A computer network comprised of heterogeneous devices among which migration of an application is effected, comprising:
   (a) a source device on which an application to migrate runs; and (b) a target device to which the application migrates, the target device having a hardware configuration, wherein said source device is operable to automatically obtain information about the hardware configuration of the target device automatically, to examine the application in reference to the hardware configuration of the target device, and to select migratable program components of the application based on the hardware configuration information about the target device in order to port the application to the target device and capture a running state of the application on the source device, wherein the source device selects migratable program components by selecting one or more device dependent components and one or more device independent components to port to the target based on information about the target device, including selecting one device dependent component different than that which is running on the source device;

the target device is operable to load the ported application and instantiate the application thereon, using the captured running state of the application.

17. A computer network according to claim 16, and the application is ported to the target device by selecting from each set at least one component that best fits on the target device.

18. A computer network according to claim 16, wherein the target device loads the application from a group of devices.

19. A computer network according to claim 18, wherein the group of devices includes the source device.

20. A computer network according to claim 16, wherein the target device is one of a plurality of target devices, and the application is divided and distinct portions of the application are loaded onto more than one of the plurality of target devices.

21. An apparatus for effecting migration of an application running on a source device to a target device, comprising:
means for examining the application running on the source device and for automatically obtaining hardware configuration information about the target device to port the application to the target device:
means for causing the ported application to be loaded on the target device, including means for selecting migratable program components of the application based on the hardware configuration information about the target device to port to the target device;, wherein the means for selecting migratable program components comprises means for selecting one or more device dependent components and one or more device independent components to port to the target based on information about the target device, including selecting one device dependent component different than that which is running on the source device;
means for transferring to the target device a running state of the application that exists on the source device; and
means for causing the ported application to be instantiated on the target device, using the running state transferred from the source device.

22. An article of manufacture having one or more recordable media with instructions thereon which, when executed by one or more devices, cause the one or more devices to effecting migration of an application running on a source device to a target device by:
(a) examining the application running on the source device and automatically obtaining hardware configuration information about the target device to port the application to the target device:
(b) causing the ported application to be loaded on the target device, including selecting migratable program components of the application based on the hardware configuration information about the target device to port to the target device, wherein selecting migratable program components comprises selecting one or more device dependent components and one or more device independent components to port to the target based on information about the target device, including selecting one device dependent component different than that which is running on the source device;
(c) transferring to the target device a running state of the application that exists on the source device; and
(d) causing the ported application to be instantiated on the target device, using the running state transferred from the source device.

23. A method for effecting migration of an application running on a source device to a target device, comprising:
automatically sending hardware configuration information about the target device to the source device in response to a request from the source device;
loading a version of the application on the target device while the application is running on the source device, the ported version consisting of migratable program components of the application selected to be appropriate for the target device based on the hardware configuration of the target device, wherein the migratable program components comprise one or more device dependent components and one or more device independent components and includes one device dependent component different than that which is running on the source device;
receiving a running state of the application that exists on the source device; and
instantiating the version of the application using the running state of the application that exists on the source device.

24. The method defined in claim 23 wherein receiving the running state of the application precedes loading the ported version of the application.

25. The method defined in claim 23, and the ported version of the application comprises at least one component from each set of one or more components that is best suited to execute on the target device.

26. The method defined in claim 25 wherein the at least one component from each set of one or more components is best suited to execute on the target device based on the hardware configuration of the target device.

27. The method defined in claim 25 wherein each set of a subset of the sets of one or more components include one device-independent component, whereas each of sets of one or more components not in the subset include a plurality of alternative device-dependent components.

28. The method defined in claim 23 wherein the ported version of the application is loaded from a group of devices.

29. The method defined in claim 28 wherein the group of devices includes the source device.

30. The method defined in claim 23 wherein the target device is one of a plurality of target devices, and the application is divided and distinct portions of the application are loaded onto more than one of the plurality of target devices.

31. An article of manufacture having one or more recordable media with instructions thereon which, when executed by one or more devices, cause the one or more devices to effecting migration of an application running on a source device to a target device by:
- automatically sending hardware configuration information about the target device to the source device in response to a request from the source device;
- loading a version of the application on the target device while the application is running on the source device, the ported version consisting of migratable program components of the application selected to be appropriate for the target device based on the hardware configuration of the target device, wherein the migratable program components comprise selecting one or more device dependent components and one or more device independent components and includes one device dependent component different than that which is running on the source device;
- receiving a running state of the application that exists on the source device; and
- instantiating the version of the application using the running state of the application that exists on the source device.

32. An apparatus for effecting migration of an application running on a source device to a target device, comprising:
- means for sending hardware configuration information to the source device in response to a request from the target device;
- means for loading a version of the application on the target device while the application is running on the source device, the ported version consisting of migratable program components of the application selected to be appropriate for the target device based on the hardware configuration of the target device, wherein the migratable program components comprise selecting one or more device dependent components and one or more device independent components and includes one device dependent component different than that which is running on the source device;
- means for receiving a running state of the application that exists on the source device; and
- means for instantiating the version of the application using the running state of the application that exists on the source device.

* * * * *